Dec. 28, 1937.　　　R. H. PENNEBAKER　　　2,103,434
OIL FILTER
Filed Sept. 6, 1935　　　3 Sheets-Sheet 1
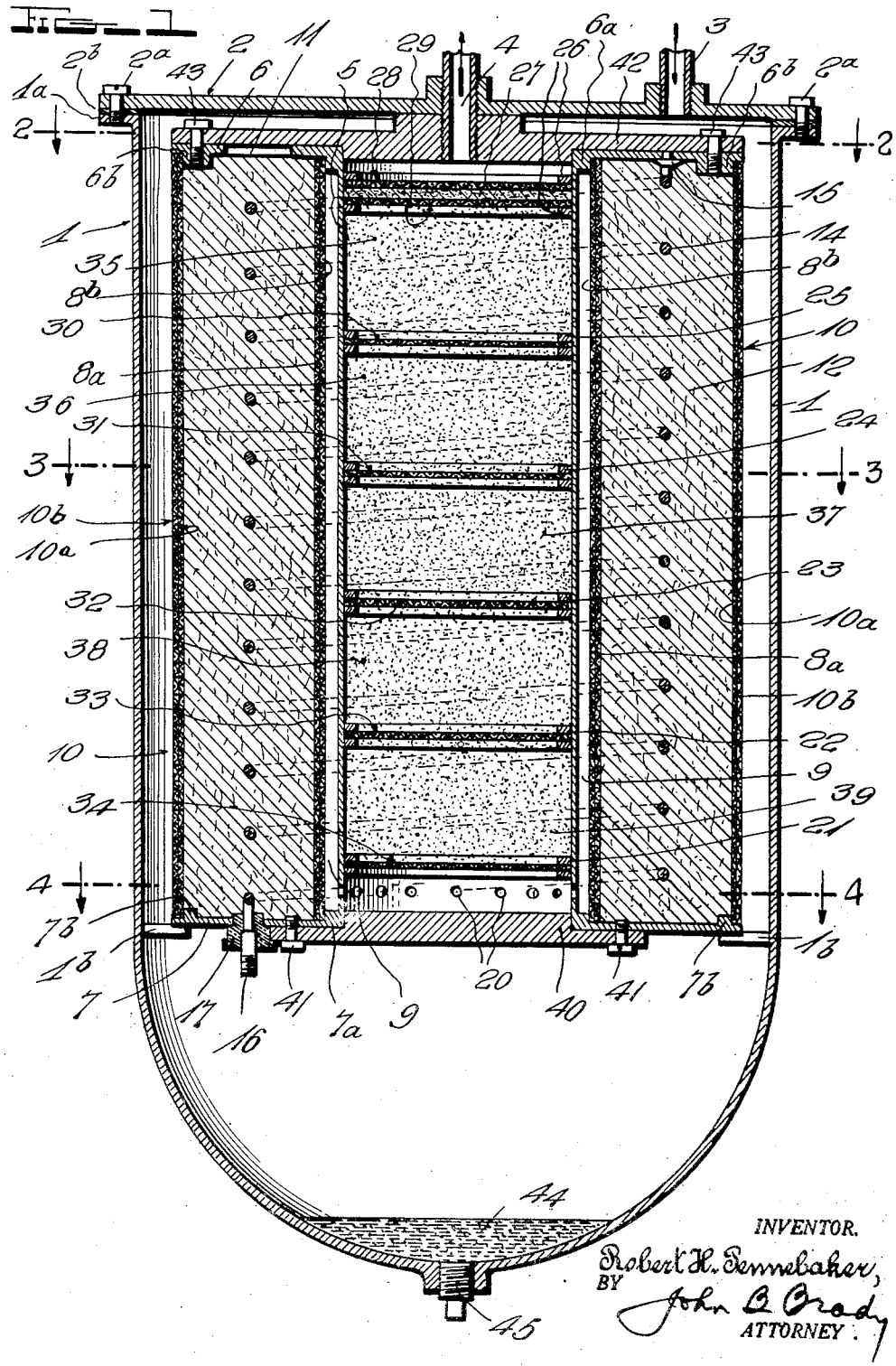
INVENTOR.
Robert H. Pennebaker,
BY John C. Brady
ATTORNEY.

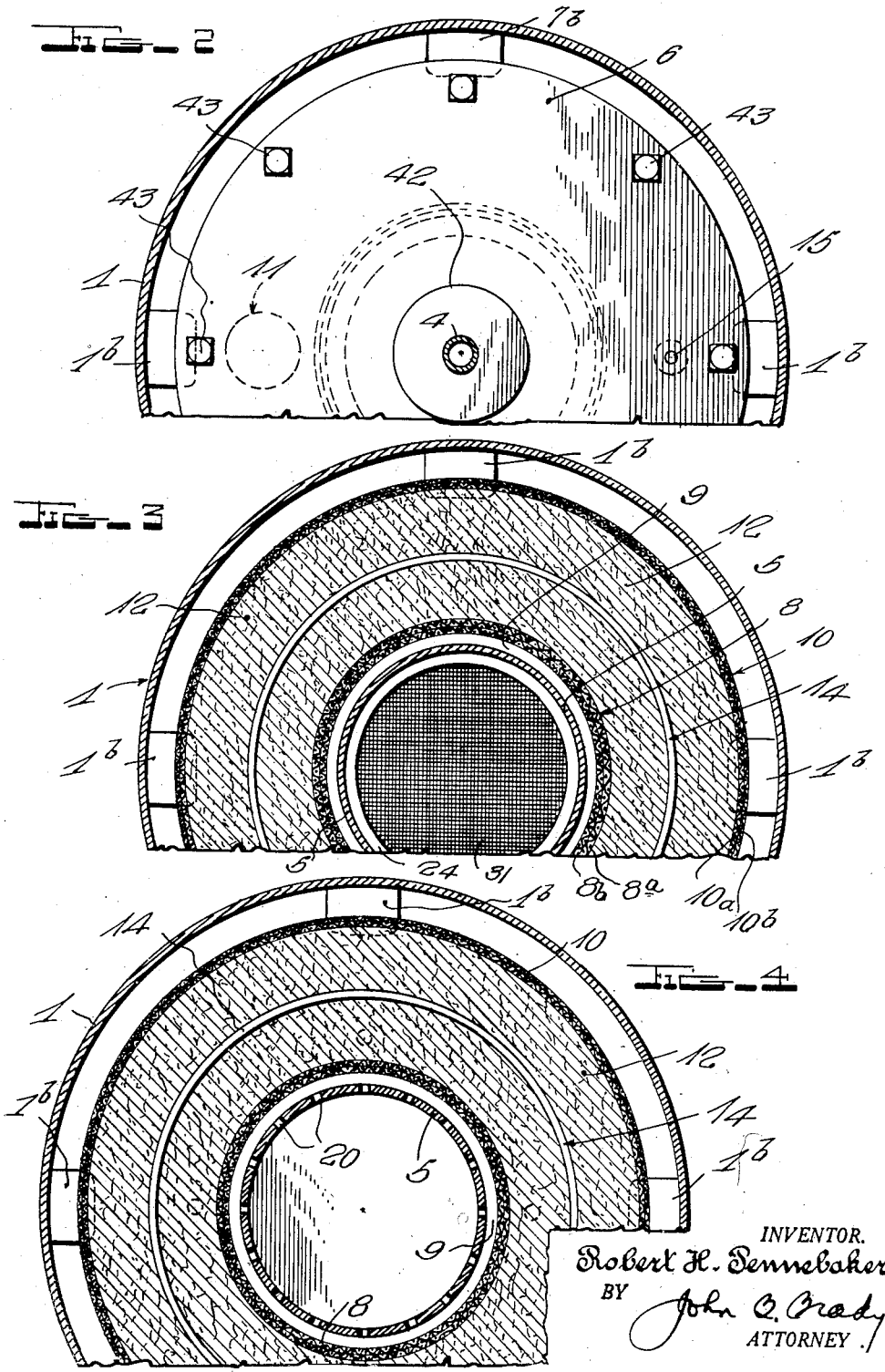

Dec. 28, 1937.　　R. H. PENNEBAKER　　2,103,434
OIL FILTER
Filed Sept. 6, 1935　　3 Sheets-Sheet 3
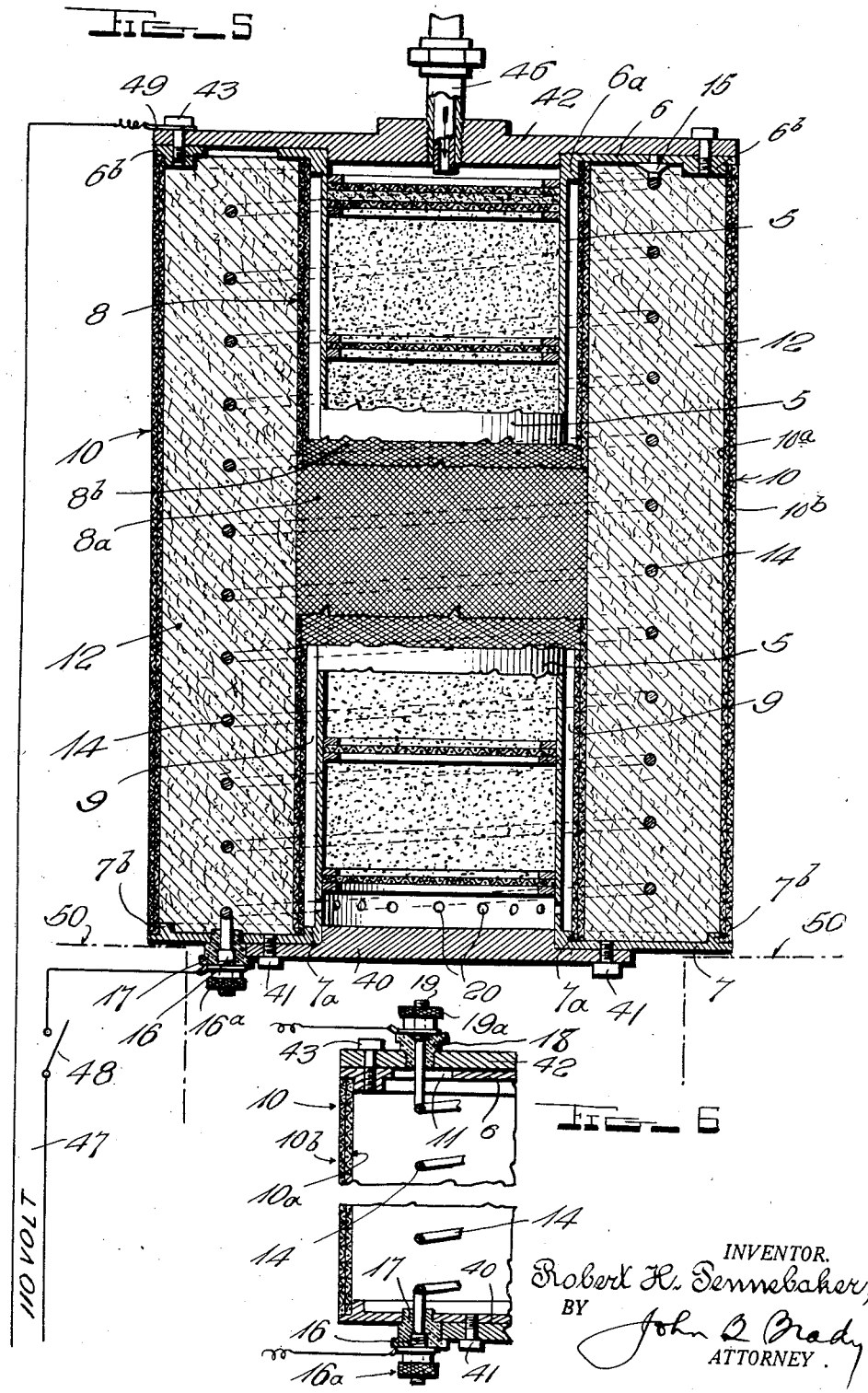

Patented Dec. 28, 1937

2,103,434

UNITED STATES PATENT OFFICE 2,103,434

OIL FILTER

Robert H. Pennebaker, Baton Rouge, La.

Application September 6, 1935, Serial No. 39,487

15 Claims. (Cl. 210—134)

My invention relates broadly to oil filters and more particularly to a construction of oil filter including a renewable filter element which may be readily cleaned and renewed from time to time.

One of the objects of my invention is to provide an inexpensive construction of oil filter employing filtering material which may be cleaned from time to time to allow continuous use of the filter over a relatively long period of time while securing efficient filtration of oil.

Another object of my invention is to provide a simplified construction of renewable oil filter which employs carded asbestos as a filtering medium.

Still another object of my invention is to provide a renewable oil filter which combines the advantageous filtration qualities of carded asbestos and bone char.

A further object of my invention is to provide a construction of filter having primary and secondary filtering compartments through which used oil is passed under pressure for filtering the oil through carded asbestos in the primary filtering compartment and through bone char in the secondary filtering compartment for effectively cleaning the used oil.

A still further object of my invention is to provide a construction of filter in which a renewable filter unit is provided with permanent electrical heating means by which the filter unit may be connected in a heating circuit and baked for a period of time for driving out all foreign matter and rejuvenating the filter unit for subsequent use.

Other and further objects of my invention reside in the construction of filter and process of rejuvenating the filter as set forth more fully in the specification hereinafter following, by reference to the accompanying drawings, in which:

Figure 1 is a vertical sectional view taken through the filter of my invention; Fig. 2 is a fragmentary horizontal sectional view through the filter taken on line 2—2 of Fig. 1; Fig. 3 is a horizontal sectional view taken on line 3—3 of Fig. 1; Fig. 4 is a fragmentary horizontal sectional view taken on line 4—4 of Fig. 1; Fig. 5 shows the filter removed from the casing and showing the electrical heating coil in the primary filter connected in a heating circuit while the filter units are subjected to a blast of air forced through the filter units in a direction opposite to the normal direction of oil flow through the filter; and Fig. 6 shows a modified arrangement of the heating coil within the primary filter unit.

My invention is directed to a simplified construction of oil filter having numerous applications both in the industrial and automotive arts. I provide a primary and secondary filtering compartment built into a single unit which is readily removable for reclaiming and replacing with respect to a main casing. The primary compartment contains packed carded asbestos which serves as a filter medium for continuous filtration of lubricating oils and like products. An electrical heating element extends through the packed carded asbestos in the primary filtering compartment and serves to provide means for baking the carded asbestos when the filtering unit is removed from the casing. That is so say, the electrical heating winding is connected in a power supply circuit and the primary filter compartments subjected to a baking action under control of the heating winding. The carded asbestos may be used with either cold or extremely hot lubricants. The material is indestructible where oil vapors are passed through it and maintains a high filtering efficiency even at high temperatures. The carded asbestos serves as an efficient filtering medium for all grades of lubricating oil and like products. The fact that the carded asbestos with ordinary use and care is indestructible insures a long effective life. The carded asbestos may be reclaimed after collecting foreign matter filtered from the oil by the baking process which is accomplished by the employment of the electrical heating winding provided in the primary filtering compartment in the filter of my invention.

I also provide a secondary filtering compartment which includes a plurality of sections of bone char separated by screens which coact with the bone char in filtering foreign matter from the oil. The secondary filtering compartment is disposed in a series path with the primary filtering compartment, so that the used oil is first acted upon by the carded asbestos and then filtered through the bone char and screens disposed in the secondary filtering compartment.

The filter is rejuvenated or reclaimed after it has become filled with foreign matter, gum and particles collected from the oil, by removing the filtering unit from the casing and connecting the electrical heating winding in the primary filtering compartment in a power circuit whereby the asbestos is slowly baked and foreign matter, gum and particles collected from the oil vaporized or loosened sufficiently to enable such matter to be forced out of the filter under the pressure of compressed air, which is passed through the filter unit in a direction opposite to the normal path of oil flow through the filter. The reclaiming process restores the filter to substantially its original efficiency, allowing reuse and extended life for the filter.

Referring to the drawings in more detail, reference character 1 designates the filter container or casing which encloses the filter unit. The casing is provided with a detachable head 2 secured to the annular flange 1a of casing 1 by means of screws 2a passing through gasket 2b. The detachable head 2 provides connecting means for the used oil inlet connection 3, and the filtered oil outlet connection 4. The filter unit is supported within the casing 1 on lugs 1b which project radially inwardly from the interior wall of casing 1. The filter unit comprises a central tubular member 5 having an upper head 6 and a lower head 7. The upper head 6 is provided with an inner annular shoulder 6a and an outer annular shoulder 6b. The lower head 7 is provided with an inner annular shoulder 7a and an outer annular shoulder 7b. These coacting shoulders are aligned one above the other to provide supports for the cylindrical screen-like walls forming the container for the primary filtering compartment.

I have shown the primary filtering compartment as contained between the metallic screen-like inner cylindrical wall 8 and the outer metallic cylindrical screen-like wall 10. The screen-like wall 8 is welded at its extremities to the annular shoulders 6a and 7a of heads 6 and 7. The screen-like wall 10 is welded at its extremities to the annular shoulders 6b and 7b of heads 6 and 7. The cylindrical screen-like walls are each multi-layered. The inner lining of the primary compartment is formed by screens 8a and 10a which may be #20 mesh screen. The outer covering 8b and 10b is formed from hardware cloth of one-eighth inch mesh or finer size. The screen-like walls 8 and 10 welded to the upper and lower heads 6 and 7 form a rigid container for the carded asbestos which is filled into the primary filtering compartment. The carded asbestos has a shredded characteristic and is capable of being packed into the primary filtering container by blowing the fibres of the asbestos through the aperture 11 in the head 6 of the filtering unit. A multiplicity of filling apertures may be provided in the head to insure the more rapid packing of the asbestos fibres in the primary filtering compartment if desired. By reason of the packing operation the asbestos fibres are closely compacted as shown at 12 within the primary filtering compartment. The electrical heating coil is self-supporting in construction and has the turns thereof disposed at spaced intervals as represented at 14 arranged centrally with respect to the compacted mass of asbestos fibres within the primary filtering compartment.

The opposite ends of the electrical heating winding 14 are provided with suitable terminals for facilitating the connection of the heating winding in a power supply circuit when the filter unit is removed from the casing 1. In the form of my invention illustrated in Figs. 1-5 the upper end of heating winding 14 is grounded as indicated at 15 to the upper head 6 of the filter unit. The lower end of electrical heating winding 14 connects to terminal 16 supported in insulated bushing 17. Terminal 16 is suitably screw-threaded so that binding post 16a may be screwed thereon as shown in Figs. 5 and 6 when the filter unit is removed from the casing 1 for reconditioning the unit. The electrical heating winding may be suitably insulated and may comprise a spiral heating coil wound on suitable core and encased within a vitreous tube compacted beneath an external protective metallic sheath. Instead of grounding the upper end of the electrical heating coil 14 to the upper head 6 I may protect the end of winding 14 by means of an insulated bushing 18 as shown in Fig. 6. In this arrangement the end of winding 14 may be protected by extending the end of the winding through insulated bushing 18 to terminal 19 which does not project any substantial distance beyond the upper detachable head 42 to allow clearance beneath the head 2 of container 1. Screw device 19a may be engaged with terminal 19 when the filter unit is connected in the power circuit for rejuvenating the filter unit.

The secondary filtering compartment is disposed centrally of the filter unit within the central tubular member 5. The central tubular member 5 is provided with a peripheral row of apertures 20 near the base of the tubular member to allow the oil which has been filtered through the primary filtering compartment to pass into the secondary filtering compartment by way of the narrow path 9 between the inner wall 8 of the primary filtering compartment and the exterior wall of the central tubular member 5. The secondary compartment includes a plurality of sections filled with bone char, filtering clay, or fuller's earth or the like. The several sections are formed by the arrangement of sets of supporting rings which I have indicated at 21, 22, 23, 24, 25, and 26, which are suitably secured at spaced intervals to the interior cylindrical wall of the central tubular member 5.

The sets of supporting rings 26 serve to mount the asbestos mat 27 between the screen members 28 and 29 adjacent the top of the secondary filtering compartment. To secure adequate filtering action and proper support for asbestos mat 27 the screen members 28 and 29 are of relatively fine mesh, such as #80 wire mesh screen. The screen members which are mounted between sets of supporting rings 21—26 may be selected of such sizes as to insure adequate filtering action. I have found stiff #30 mesh screen suitable for this purpose. The screen members are mounted at 30, 31, 32, 33, and 34 between sets of supporting rings 25, 24, 23, 22 and 21, respectively. The sections of the secondary filtering compartment are indicated at 35, 36, 37, 38 and 39, filled with bone char, filtering clay, or fuller's earth and the like.

I provide a lower detachable head 40 for the secondary filtering compartment and secure the head in position by means of screws 41. The lower detachable head 40 has a central cylindrical portion projecting upwardly and entering the lower end of central tubular member 5 in the nature of a plug. The upper end of the secondary filtering compartment is closed by means of the upper detachable head 42 secured to the upper head 6 by means of screws 43. The upper detachable head 42 has a depending central cylindrical portion which serves as a plug to close the upper end of the secondary filtering compartment. The upper detachable head 42 also has an upwardly extending central portion which directly abuts against head 2 of the enclosing casing when the filter unit is locked in position and connection established with oil discharge pipe 4 as shown in Fig. 1.

The casing 1 is bowl-shaped at its lower extremity to provide a sludge, moisture and sediment trap, which matter collects in the base of the casing 1, as indicated at 44, and may be drawn off from time to time by removing drain plug 45.

When it is desired to clean or recondition the filter, the filter unit is removed from the casing 1 as represented in Fig. 5, and is mounted on a suitable support such as indicated by the dotted lines 50, and a pipe 46 screwed into the upper detachable head 42 of the filter unit. Compressed air is blown through pipe 46 and passes through the primary and secondary filtering compartments in a direction opposite to the normal direction of flow of the oil through the filter. The electrical heating coil 14 is connected to the power supply circuit 47 through switch 48 and connection 49 suitably secured beneath one of the securing screws 43 grounded to the casing of the filter unit, and thus connected to the upper end of heating winding 14, and to the connection under binding post 16a which connects to the opposite end of electrical heating winding 14. The electrical heating coil is raised in temperature and heats the asbestos packing in the primary filtering compartment, vaporizing foreign matter and allowing a thorough cleaning of the filtering medium. The carded asbestos becomes substantially reconditioned and the bone char becomes clarified thereby reconditioning the filter and restoring substantially the original properties thereof ready for reuse.

I have described my invention in certain of its preferred embodiments, but I am fully aware that modifications and changes may be made, and I do not intend any limitations upon my invention other than are imposed by the scope of the appended claims.

What I claim as new and desire to secure by Letters Patent of the United States is as follows:

1. A filter unit including a mass of packed asbestos, and an electrical heating winding embedded in said packed asbestos and terminating in electrical terminals at opposite ends of said filter unit.

2. A filter unit comprising a mass of packed carded asbestos disposed in one portion of said filter unit, masses of filtering clay disposed in another portion of said filter unit, and an electrical heating winding extending through said packed mass of carded asbestos.

3. An oil filter comprising a casing, a filter unit removably mounted in said casing, said filter unit being divided into separate compartments, one of said compartments containing a mass of packed asbestos fibres, another of said compartments including a multiplicity of sections disposed in series, screen members separating each of the sections of said last mentioned compartment, and filtering clay in the sections of the last mentioned compartment, said filter unit and the designated filtering mediums adapted to be subjected to high temperatures to facilitate the cleansing thereof.

4. A filter unit including a central tubular member having laterally disposed flanges at opposite ends thereof, and a pair of cylindrical screen members concentrically disposed about said tubular member in spaced positions between said flanges, a packed mass of carded asbestos disposed between said screen members, filtering clay disposed within said central tubular member, and means for directing oil through the packed mass of carded asbestos and through said filtering clay.

5. An oil filter comprising a casing, a filter unit removably mounted within said casing, oil inlet and discharge connections for said casing and connected with said filter unit, said filter unit being divided into a pair of separate compartments, one of said compartments concentrically surrounding the other of said compartments and being spaced annularly therefrom, the first mentioned compartment being filled with carded asbestos and the second mentioned compartment being filled with a filtering clay, said filter unit being removable for making at high temperatures without injury to facilitate the cleansing thereof.

6. An oil filter comprising a casing, a filter unit removably mounted in said casing, oil inlet and discharge connections for said filter unit extending through said casing, said filter unit being divided into a pair of concentrically arranged compartments including an outer annularly shaped compartment having perforate side walls and being filled with carded asbestos, and a central tubular compartment containing filtering clay, said last mentioned compartment having passages formed in one end thereof for directing oil filtered by said first mentioned compartment into said second mentioned compartment, the oil passing radially through said first mentioned compartment and longitudinally through said second mentioned compartment.

7. In an oil filter, a filter unit providing a container for a filtering medium, an electrical heating winding having the turns thereof spaced apart and disposed interiorly of the said container, means for establishing electrical connection with opposite ends of said electrical heating winding, and a filtering medium packed within said container and embedding the turns of said electrical heating winding therein.

8. A filter unit for oil filters comprising a substantially cylindrical container, an electrical heating coil having its turns spaced apart and disposed within said cylindrical container, means for establishing electrical connection with opposite ends of said electrical heating coil, and an oil filtering medium packed in said container and around the turns of said electrical heating coil.

9. An oil filter comprising a frame including a central tubular member having a laterally extending flange at each end thereof, a filtering medium disposed within said central tubular member, a filtering compartment having side walls pervious to oil concentrically disposed about said central tubular member, said central tubular member being apertured for the passage of oil from the said pervious walls and the filtering medium therebetween longitudinally through the filtering medium in said central tubular member, a removable header at each end of said central tubular member connected with the said laterally extending flanges, and an oil outlet connection in one of said headers for discharging the filtered oil.

10. A filter unit comprising a frame structure having a pair of end members, a central interconnecting member and side wall members interconnecting said end members, an electrical heating winding having its turns disposed in spaced relation between said side wall members, one of said end members being apertured between the connections of said side wall members therewith, said side wall members being pervious to the passage of air and oil whereby asbestos fibre may be blown through the apertured end member and packed between said walls pervious to oil and air and around said winding, and means for closing the apertured end of said frame structure.

11. In an oil filter, a cartridge-like filter member, a filtering medium packed within said cartridge-like filter member, an electrical heating winding extending through said cartridge-like filter member and embedded in said filtering medium, and electrical terminals formed on opposite ends of said filter member and electrically connected with said heating winding.

12. A filter unit comprising a casing having walls pervious to oil, an electrical heating winding having its turns disposed in spaced relation between said walls, means for establishing electrical connection with the opposite ends of said electrical heating winding, and a filler of carded asbestos packed between said walls and around the turns of said electrical heating winding.

13. A filter unit comprising a frame including a central tubular member having end flanges thereon, a plurality of screen-like members extending diametrically at spaced intervals within said central tubular member for dividing said central tubular member into a multiplicity of sections, an amorphous filtering medium disposed within each of said sections between said diametrically extending screen-like members, an independent filter unit confined between said end flanges and concentrically disposed about said central tubular member, and coacting with the filtration of oil through each of said plurality of sections within said central tubular member, and means for directing oil radially through said independent filter unit and longitudinally through the filter sections in said central tubular member.

14. A filter unit comprising a primary filtering compartment containing asbestos fibre as the filtering medium, a secondary filtering compartment containing bone char as the filtering medium, and means mounted in said primary filtering compartment for heating said unit to high temperatures to facilitate the renovation of the filter unit after a period of use.

15. The method of renovating an oil filter unit which consists in heating the unit containing the filtering medium to vaporize volatile matter collected thereby from the oil, and forcing compressed air through the filtering medium in the direction opposite to the normal flow of oil therethrough to discharge the vaporized material and all solid matter collected from the oil.

ROBERT H. PENNEBAKER.

CERTIFICATE OF CORRECTION.

Patent No. 2,103,434.                                                December 28, 1937.

ROBERT H. PENNEBAKER.

It is hereby certified that error appears in the printed specification of the above numbered patent requiring correction as follows: Page 3, second column, line 12, claim 5, for the word "making" read baking; and that the said Letters Patent should be read with this correction therein that the same may conform to the record of the case in the Patent Office.

Signed and sealed this 22nd day of February, A. D. 1938.

(Seal)

Henry Van Arsdale,
Acting Commissioner of Patents.